(No Model.)
J. HOUSE.
SCENIC ADVERTISING MEDIUM.
No. 435,064. Patented Aug. 26, 1890.
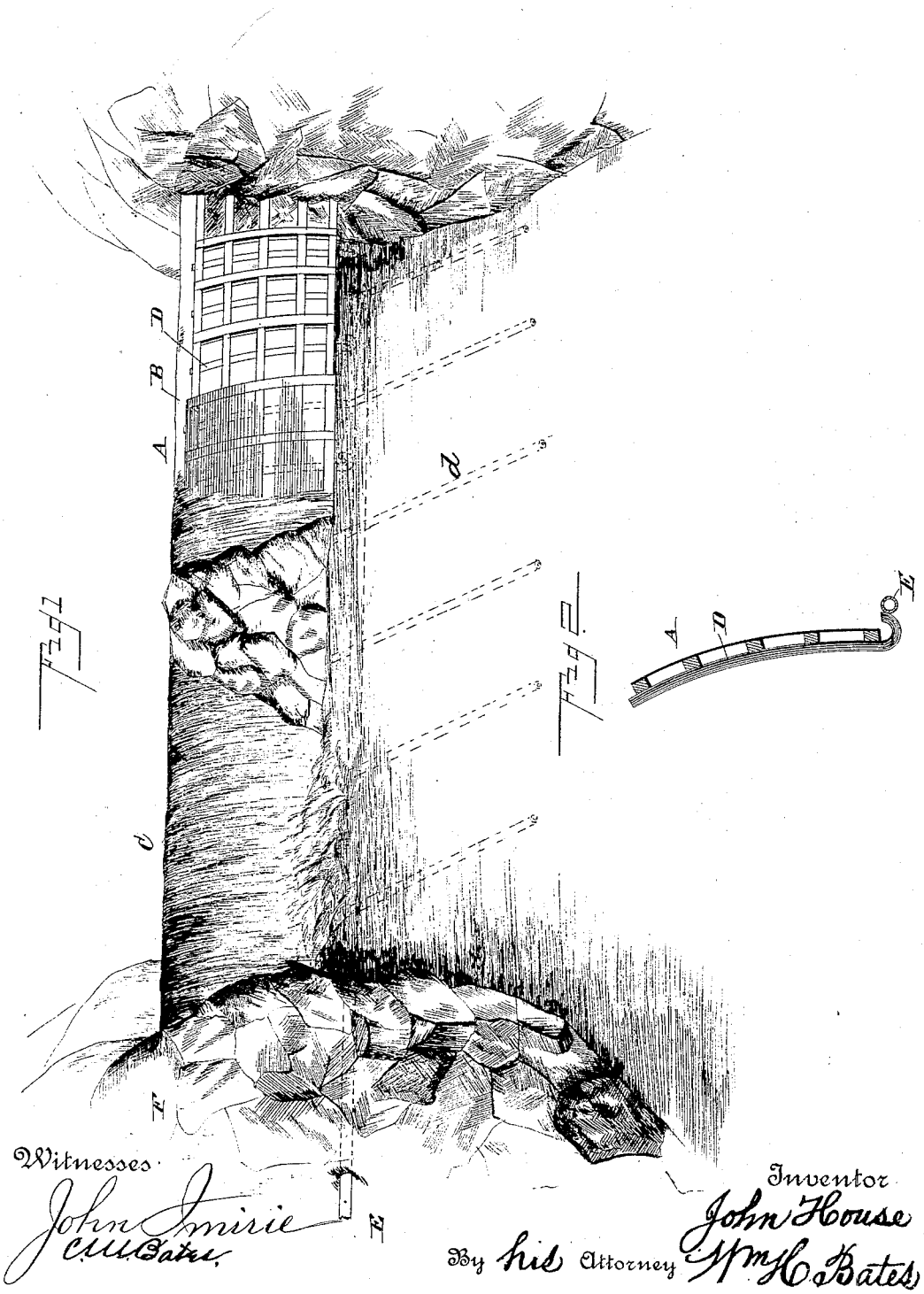
Witnesses
John Imirie
C. M. Bates
Inventor
John House
By his Attorney Wm. H. Bates

UNITED STATES PATENT OFFICE.

JOHN HOUSE, OF LEXINGTON, VIRGINIA, ASSIGNOR OF THREE-FOURTHS TO W. H. WADDELL, OF SAME PLACE, AND C. L. COOKE, W. L. WALTERS, SR., W. L. WALTERS, JR., W. T. PATTON, I. N. McFARLAND, AND D. E. EVERITT, OF STAUNTON, VIRGINIA.

SCENIC ADVERTISING MEDIUM.

SPECIFICATION forming part of Letters Patent No. 435,064, dated August 26, 1890.

Application filed May 1, 1890. Serial No. 350,197. (No model.)

*To all whom it may concern:*

Be it known that I, JOHN HOUSE, a citizen of the United States, residing at Lexington, in the county of Rockbridge and State of Virginia, have invented a new and useful Improvement in Scenic Mechanism for Theatrical and Advertising Purposes, as will be herein more particularly set forth in the following specification and summed up in the claims.

The object of my invention is to provide a means for presenting the counterfeit presentment of water-falls and the like which will exhibit all the appearance of such falls and all their appurtenances and yet involve the use of but a small quantity of water in producing such effect.

It further consists in such details of construction and organization as will be hereinafter more fully set forth and described.

Referring to the drawings which form a part of this specification, Figure 1 represents a front elevation of my invention, and Fig. 2 is a detail sectional view of the frame-work thereof.

A represents my improved illusive falls; B, a section of the glass-frames; C, a section of the falls completed. D represents pipes from which water is thrown back, so as to imitate the rebound of water as it reaches the bottom of the falls. E shows a steam-pipe extending across the lower part of the falls. From this through suitable perforations small jets of steam pass, thus giving off a sound like the distant roar of water and at the same time affording a resemblance of mist and spray.

F represents rocks or other natural features which serve to add to the realism of the effect.

The frame-work is composed of sash of any desired size, having glass arranged therein so as to give an approximately uniform surface to the same, though this is not essential, as any irregularities at the junction of each pane of glass would add to the effect by causing ripples on the film of water, and this would also complete the illusion of deep water. The sash are regulated as to size by the requirements of the case, and where they are to be used in theaters, for instance, they must necessarily be of a size to conform to the stage, distance for effect also being considered. When used in show-windows for advertising purposes, they are correspondingly small, and in such cases a single sheet of glass may be used. The horizontal surface which represents the bed of the stream, both above and below the falls, is formed of similar panels, and the unevenness therein will give to the passing water the appearance of eddies and ripples, and these will add wonderfully to the pleasing effect upon the eye. The pipe E extends along at or near the bottom of the falls and is concealed from observation. This pipe has any required number of perforations therein for the exit of steam. Some of these perforations are small, so as to create a mist from the steam, while others are larger to create a roaring sound. The pipes D are placed at intervals along the vertical portion of the falls. The upper ends of these pipes are bent at approximately right angles, so as to receive water from the upper surface of the falls. The lower ends describe an upward curve, so that water entering the upper part of these pipes will fall and be ejected from the lower ends in the form of spray. This will help to give the water the confused tumbled appearance that falls usually present. The rocks on the shore or in the stream at the brink of the falls may have suitable advertising inscriptions thereon, or they may have sign-posts and the like placed upon them, and thus the falls become a valuable advertising medium.

In operation water is ejected over the upper surface of the stream from any suitable source of supply, a perforated pipe being, it is thought, the most desirable medium. This water passes downward to the brink of the falls, when it passes over some of it going through the tubes D to give the effect before described. After passing over the falls the water will continue to flow over the lower part of the stream until it is lost to sight in any desired form of concealment. The glass being painted so as to resemble water, there will only be a film of the same necessary to complete the illusion. Various modifications and arrangements will suggest themselves which I have not deemed it essential to present in this case. These will not of course depart from the spirit of my invention.

Having thus described my invention, what I claim is—

1. In a device for the display of advertisements and the like, a scenic representation of water-falls, a water-fall consisting of a bed of glass or analogous material painted on its rear side to represent the falls on a suitable frame-work over which a film of water is projected.

2. In a device for the display of advertisements and the like, a scenic representation of water-falls, a water-fall consisting of a bed of glass or analogous material suitably supported, over which a film of water is projected, and means for creating an artificial vapor at the base of said falls.

3. In a device for the display of advertisements and the like, a scenic representation of water-falls, a water-fall consisting of a bed of glass or analogous material on a suitable frame-work, over which a film of water is projected, perforated pipes for discharging jets of steam or vapor to mingle with the water, and tubes for taking up a portion of the water-head and projecting the same upward.

4. In a device for the display of advertisements and the like, a scenic representation of water-falls, a water-fall consisting of a bed of glass or analogous material, over which a film of water is projected, vertical pipes connecting with the back of the falls and the base thereof to discharge upwardly streams or jets from the head thereof, and a horizontal pipe suitably perforated, from which steam-jets are ejected to represent spray or mist.

5. In a device for the display of advertisements and the like, a scenic representation of water-falls, the combination, with a glass covering, of a stream of water running over it, together with a frame-work in the rear painted to represent the falling water.

JOHN HOUSE.

Witnesses:
C. N. IRELAN,
J. L. CURTIS.

It is hereby certified that the last named assignee in Letters Patent No. 435,064, granted August 26, 1890, upon the application of John House, of Lexington, Virginia, for an improvement in "Scenic Advertising Mediums," was erroneously written and printed "D. E. Everitt," whereas said name should have been written and printed *D. E. Euritt;* and that the said Letters Patent should be read with this correction therein that the same may conform to the corrected files and records of the case in the Patent Office.

Signed, countersigned, and sealed this 2d day of September, A. D. 1890.

[SEAL.]
                                                          GEO. CHANDLER,
                                          *First Assistant Secretary of the Interior.*

Countersigned:
    ROBERT J. FISHER,
        *Acting Commissioner of Patents.*